US010587309B1

(12) United States Patent
Scott et al.

(10) Patent No.: US 10,587,309 B1
(45) Date of Patent: Mar. 10, 2020

(54) INTERMITTENT ACTUATORS POWERED BY TWISTED-WIRE CONNECTION

(71) Applicant: Robert Bosch GmbH, Stuttgart (DE)

(72) Inventors: Timothy Scott, Milford, MI (US); Todd Ellis, Berkley, MI (US); Rainer Berger, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/410,394

(22) Filed: May 13, 2019

(51) Int. Cl.
  *H04B 3/54* (2006.01)
  *H04L 12/40* (2006.01)
  *H04L 12/10* (2006.01)
  *H01R 24/64* (2011.01)

(52) U.S. Cl.
  CPC ............ *H04B 3/548* (2013.01); *H01R 24/64* (2013.01); *H04L 12/10* (2013.01); *H04L 12/40045* (2013.01)

(58) Field of Classification Search
  CPC .. H04B 3/548; H04B 2203/5483; H04B 3/56; H04B 2203/5491; H04B 3/542; H04L 12/10; H04L 12/40045; H04L 25/0266; H01R 24/64
  See application file for complete search history.

(56) References Cited

U.S. PATENT DOCUMENTS

| 10,361,802 B1 * | 7/2019 | Hoffberg-Borghesani ........ H04N 5/782 |
| 2019/0281725 A1 * | 9/2019 | Byers ................. H05K 7/20763 |
| 2019/0291184 A1 * | 9/2019 | Buller ................... B29C 64/371 |

* cited by examiner

*Primary Examiner* — Ted M Wang
(74) *Attorney, Agent, or Firm* — David Kovacek; Maginot, Moore & Beck LLP

(57) ABSTRACT

A system comprising a twisted-wire connection providing data and power signals to devices, the devices comprising power storage to be utilized later for intermittent operation. Device operation may require a higher wattage than is specified for the power signal delivered via the twisted-wire connection. A human-machine interface may provide user input to further control of the device.

20 Claims, 4 Drawing Sheets

INTERMITTENT ACTUATORS POWERED BY TWISTED-WIRE CONNECTION

TECHNICAL FIELD

This disclosure relates to a system of power distribution utilizing low-wattage electrical channels, such as Ethernet.

BACKGROUND

Ethernet is a twisted-wire communication standard that utilizes multiple pins to transfer both data signals and power signals. The associated power signals may be utilized to power devices connected to an Ethernet network.

Existing devices powered by Ethernet are limited by the relatively low wattage available by existing Ethernet specifications. Such devices are typically low-powered, and limited in number so as not to overdraw power from the Ethernet source, resulting in malfunction of the device or another device on the network. It would be advantageous to utilize Ethernet and other low-power twisted-wire connections to power devices having higher power requirements.

SUMMARY

One aspect of this disclosure is directed to an automated actuator system comprising a controller, a twisted-wire connector, an energy storage unit, and an actuator. The twisted-wire connector may be in electrical communication with the controller and operable to transmit electrical power at a first wattage level. The energy storage unit may be in selective electrical communication with the twisted-wire connector, and may further be operable to receive electrical power at the first wattage level. The energy storage unit may further be operable to discharge stored electrical power at a second wattage level higher than the first wattage level. In some embodiments, the second wattage may be higher than the wattage deliverable by the twisted-wire connector. The actuator may be configured to be in selective electrical communication with the energy storage unit and in data communication with the controller. The actuator may be operable when receiving electrical power at a wattage level above the first wattage level but not greater than the second wattage level. The system may further comprise a human-machine interface operable to receive a user input and in data communication with the controller, controller operable to utilize the user input to selectively engage the electrical communication between the energy storage unit and the twisted-wire connector and selectively engage the electrical communication between the energy storage unit and the actuator. In some embodiments the selective engagements may be responsive to the user input. In some embodiments, the twisted-wire connector may comprise an Ethernet connector.

Another aspect of this disclosure is directed to an automated actuator system comprising a controller, a twisted-wire connector, an energy storage unit, a first actuator and a second actuator. The twisted-wire connector may be in electrical communication with the controller and operable to transmit electrical power at a first wattage level. The energy storage unit may be in selective electrical communication with the twisted-wire connector, and may further be operable to receive electrical power at the first wattage level. The energy storage unit may further be operable to discharge stored electrical power at a second wattage level higher than the first wattage level. The actuators may be configured to be in selective electrical communication with the energy storage unit and in data communication with the controller. The actuators may be operable when receiving electrical power at a wattage level above the first wattage level but not greater than the second wattage level. The system may further comprise a human-machine interface operable to receive a user input and in data communication with the controller, controller operable to utilize the user input to selectively engage the electrical communication between the energy storage unit and the twisted-wire connector and selectively engage the electrical communication between the energy storage unit and the actuator. In some embodiments the selective engagements may be responsive to the user input. In some embodiments, the twisted-wire connector may comprise an Ethernet connector.

The above aspects of this disclosure and other aspects will be explained in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
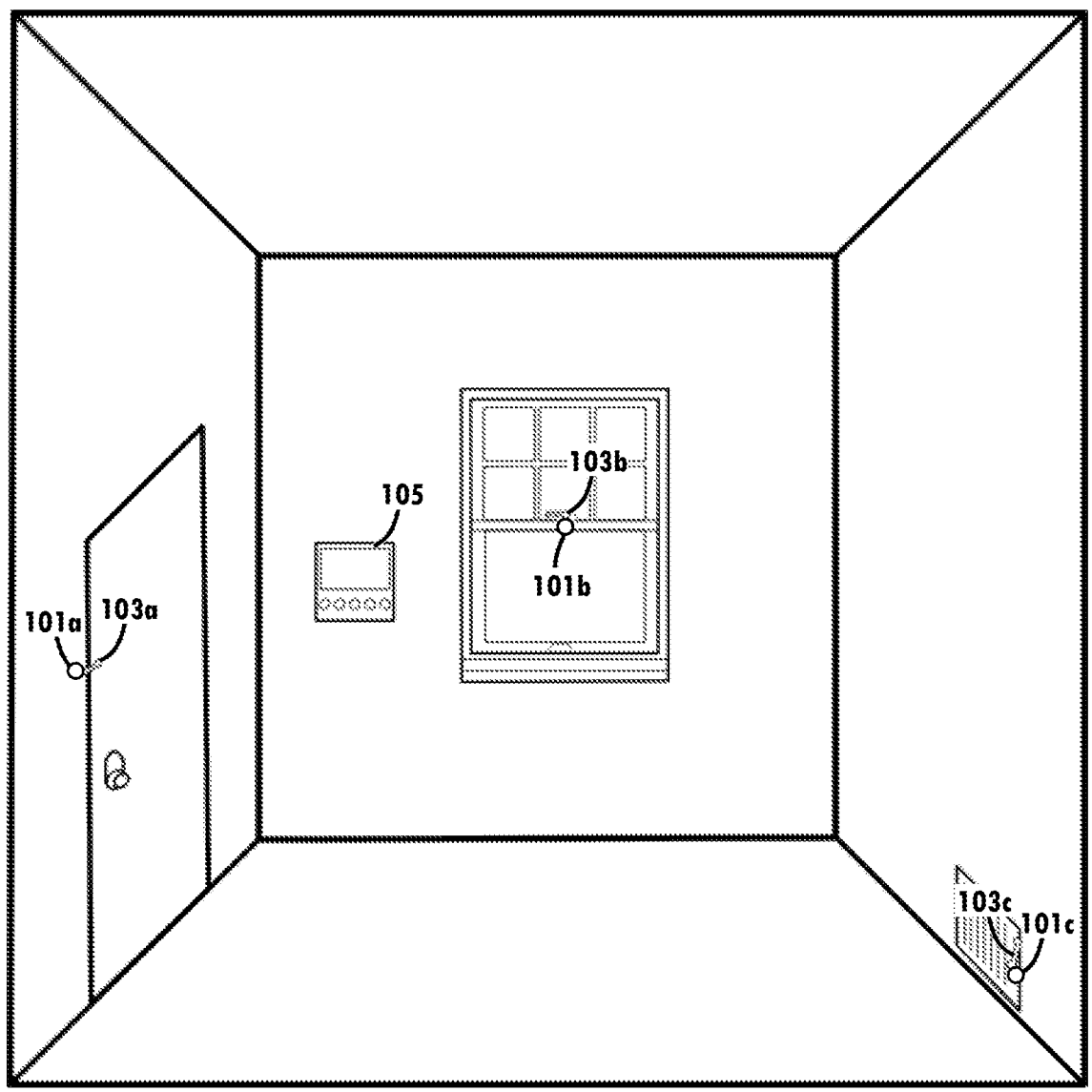
FIG. 1 is an illustration of an automated actuator system having multiple actuators.

FIG. 1 illustrates one embodiment of an installed automated actuator system of the disclosed teachings herein, installed in the context of a room. The automated actuator system depicted shows a number of drive units 101 operable to adjust the physical condition of a corresponding target device 103. The system may be controlled or inspected by a user utilizing a human-machine interface (HMI) 105. The drive units may be powered using a low-power electrical connection (not shown). Each low-power electrical connection may advantageously permit the installation of the automated actuator system without requiring special skills or permits that would be required of conventional high-power electrical circuits. In the depicted embodiment, the drive units are powered using a twisted-wire connection, such as an Ethernet cable, but other embodiments may comprise other low-power electrical connections without deviating from the teachings disclosed herein.

Conventional low-power electrical connections are currently used to power low-power devices that can utilize the power supplied by the connection on-demand without causing a failure in the system, or to another component of the system. In the depicted embodiment, each of drive units 101 comprises an actuator (not shown) operable to function at a wattage level above the power that can be delivered by the low-powered electric connection. The drive units 101 instead comprise an energy storage unit (not shown) operable to store the electrical power until such time that operation of the associated actuator is required. The actuators may comprise any mechanical function that may be suitably operated using a power deliverable by the drive unit, such as a motor, a rotor, a lever, a switch, or other mechanisms known to one of ordinary skill in the art. The primary limitation of the actuators is the amount of power that may be stored and delivered by the drive units, and individual drive units may have different power-handling specifications.

Operation of the actuators may be controlled via user input of the HMI 105. Operation of one or more actuators may be controlled according to programmed schedule. In the depicted embodiment, HMI 105 comprises a wall panel, but other embodiments may comprise other configurations without deviating from the teachings disclosed herein. Other embodiments may comprise a human-machine interface configuration such as a smart phone device, a personal computer, a tablet computer, or a set of buttons electrically-connected to one or more of drive units 101.

In some embodiments, the low-powered electrical connection may advantageously comprise an Ethernet connection, which may utilize the electrical power already being transmitted by the normal operation of the Ethernet connection according to its specification. In such embodiments, the power source for the twisted-wire connection may comprise an existing Ethernet network or device within the building, such as a local-area network (LAN) hub, a LAN server, a LAN router, or other Ethernet distribution devices or systems known to one of ordinary skill in the art without deviating from the teachings disclosed herein.

In the depicted embodiment, the target devices comprise a door latch 103a, a window latch 103b, and a vent shutter 103c, but other embodiments may comprise other target devices without deviating from the teachings disclosed herein. In some embodiments, drive units 101 may comprise identical configurations, but other embodiments may comprise specially-configured drive units having an actuator operable to perform a specific task. In the depicted embodiment, drive unit 101a may be operable to lock or unlock door latch 103a, drive unit 101b may be operable to lock or unlock window latch 103b, and drive unit 101c may be operable to open or close the vent associated with vent shutter 103c. Other embodiments may comprise drive units configured with actuators suitable to perform tasks such as opening a door, closing a door, opening a window, closing a window, changing the configuration of window shades or blinds, sounding an alarm, adjusting the configuration of an electric recliner, adjusting the height of an electric desk or table, or any other task suitable to be completed intermittently using an actuator without deviating from the teachings disclosed herein.

Figure 2:
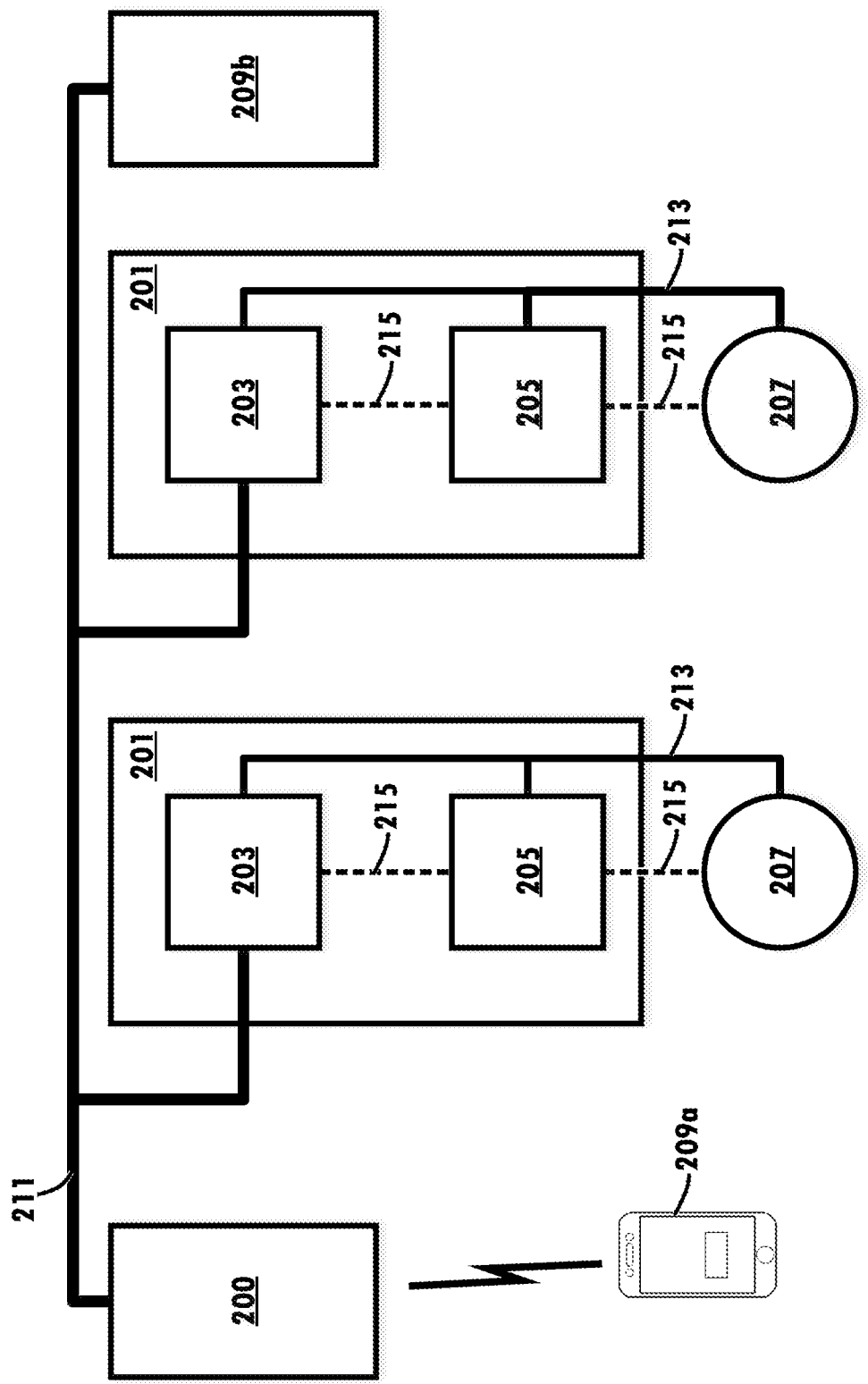
FIG. 2 is diagrammatic illustration of a first embodiment of an automated actuator system.

FIG. 2 depicts a diagrammatic view of an automated actuator system according to one embodiment disclosed herein. The system is powered by a power hub 200, which provides power and data to number of drive units 201. Each of the drive units 201 comprises an electronic control unit (ECU) 203 and an energy storage unit 205. The drive units 201 are each in electrical communication with an associated actuator 207. In the depicted embodiment, drive units 201 may be the same as drive units 101, but other embodiments may comprise other configurations without deviating from the teachings disclosed herein. The system also comprises a number of HMIs 209. In the depicted embodiment, there are two HMIs having different configurations, but other embodiments may comprise a different number of HMIs or different combined configurations without deviating from the teachings disclosed herein. In the depicted embodiment, HMI 209a comprises a smartphone in wireless communication with power hub 200, and HMI 209b comprises an access panel in wired communication with power hub 200, but other embodiments may comprise different or additional configurations without deviating from the teachings disclosed herein.

In the depicted embodiment, electrical connections may comprise data connections, power connections, or a combination of data connections and power connections. In the depicted embodiment, electrical connection 211 comprises a twisted-wire connection having data connection pins and power connection pins, each operable to transmit both data signals and power signals respectively. In the depicted embodiment, twisted-wire connection comprises an Ethernet channel, but other embodiments may comprise other twisted-wire connections without deviating from the teachings disclosed herein. Additional illustrated connections of the depicted embodiment may be a data connection 213, or a power connection 215.

Each ECU 203 is in data communication with an associated energy storage unit 205 and an associated actuator 207 via a data connection 213. Data connection 213 may be operable to transmit commands from the ECU 203 to a respective energy storage unit 205 or actuator 207. Data communication may comprise commands for selectively engagement or disengagement of a function of the associated energy storage unit 205 or actuator 207. For example, ECU 203 may be operable to command an associated energy storage unit 205 to engage a charging function. In another example, ECU 203 may be operable to command an associated actuator 207 to initiate its primary function.

Each ECU 203 is in power communication with its respective energy storage unit 205 via a power connection 215. The power connection between an ECU 203 and an associated actuator 207 may be operable to pass electrical power at a first wattage level suitable to charge energy storage unit 205. In some embodiments, energy storage unit 205 may be in direct electrical communication with the power-connection pins of twisted-wire connection 211 without deviating from the teachings disclosed herein. In such embodiments, ECU 203 may not act as a pass-through for power-connection pins. In the depicted embodiment, utilizing ECU 203 as a pass-through for power communication to energy storage unit 205 may advantageously provide additional functions pertaining to the power connection, such as monitoring of power level.

In the depicted embodiment, each of the energy storage units 205 is in power communication with an associated actuator 207 via a power connection 215. The power connection between an energy storage unit 205 and an associated actuator 207 may be operable to pass electrical power at a second wattage level suitable to operate the functions of the associated actuator 207. In the depicted embodiment, the second wattage level may be higher than the first wattage level necessary to charge the associated energy storage unit 205. In such embodiments, the operation of actuator 207 may advantageously be specified for a function that is desired intermittently, providing sufficient power for operation and permitting the associated energy storage unit 205 to charge between the intermittent operations. Such an arrangement is advantageous because it requires a lower deliverable wattage from twisted-wire connection 211, and may permit a lower total stored energy requirement from energy storage unit 205. A lower total stored energy requirement for energy storage unit 205 may be advantageous by reducing the cost and size requirements of energy storage unit 205. In some embodiments, the second wattage level may be higher than the total wattage deliverable by the of twisted-wire connection 211 without deviating from the teachings disclosed herein.

Energy storage unit 205 may comprise an energy storage and discharge arrangement suitable to deliver an operational wattage to an associated actuator. In the depicted embodiment, energy storage unit 205 may comprise a rechargeable battery component, or a super-capacitor configuration (also called a "super cap" configuration). Rechargeable batteries may comprise a lithium-ion configuration, a chemical configuration, or any other configuration known to one of ordinary skill in the art without deviating from the teachings disclosed herein. Rechargeable battery configurations may advantageously utilize lower-cost materials. In contrast, super cap configurations may advantageously utilize configurations that have much higher lifecycles operable for a much higher number of charge/discharge cycles. In some embodiments, a super cap configuration may be effective to store sufficient operational energy for up to 10,000 charge/discharge cycles. Such configurations may be advantageous for a permanent installation of the system because the number of operational cycles may exceed the expected lifespan of the associated actuator. In some embodiments, super cap configurations may advantageously be operable to charge more quickly than a batter configuration.

In the depicted embodiment, each ECU 203 is in data communication with a respective energy storage unit 205 and a respective actuator 207 via a data connection 213. ECU 203 may utilize data connection 213 to control the functions of the associated energy storage unit 205 or associated actuator 207. The commands of an ECU 203 may be generated in response to user input provided at a HMI 209. In some embodiments, the system may comprise a heterogeneous arrangement, wherein the energy storage units 205 may comprise a plurality of configurations or the actuators 207 may comprise a plurality of configurations. In the depicted embodiment, one or more of ECUs 203 may be programmable to provide particular commands suitable to the associated energy storage unit 205 or associated actuator 207. In the depicted embodiment, one or more of ECUs 203 may be operable to store a time schedule detailing when the operations of the associated elements should be performed. In the depicted embodiment, the time schedule may be modified by user input provided to one of HMIs 209.

Figure 3:
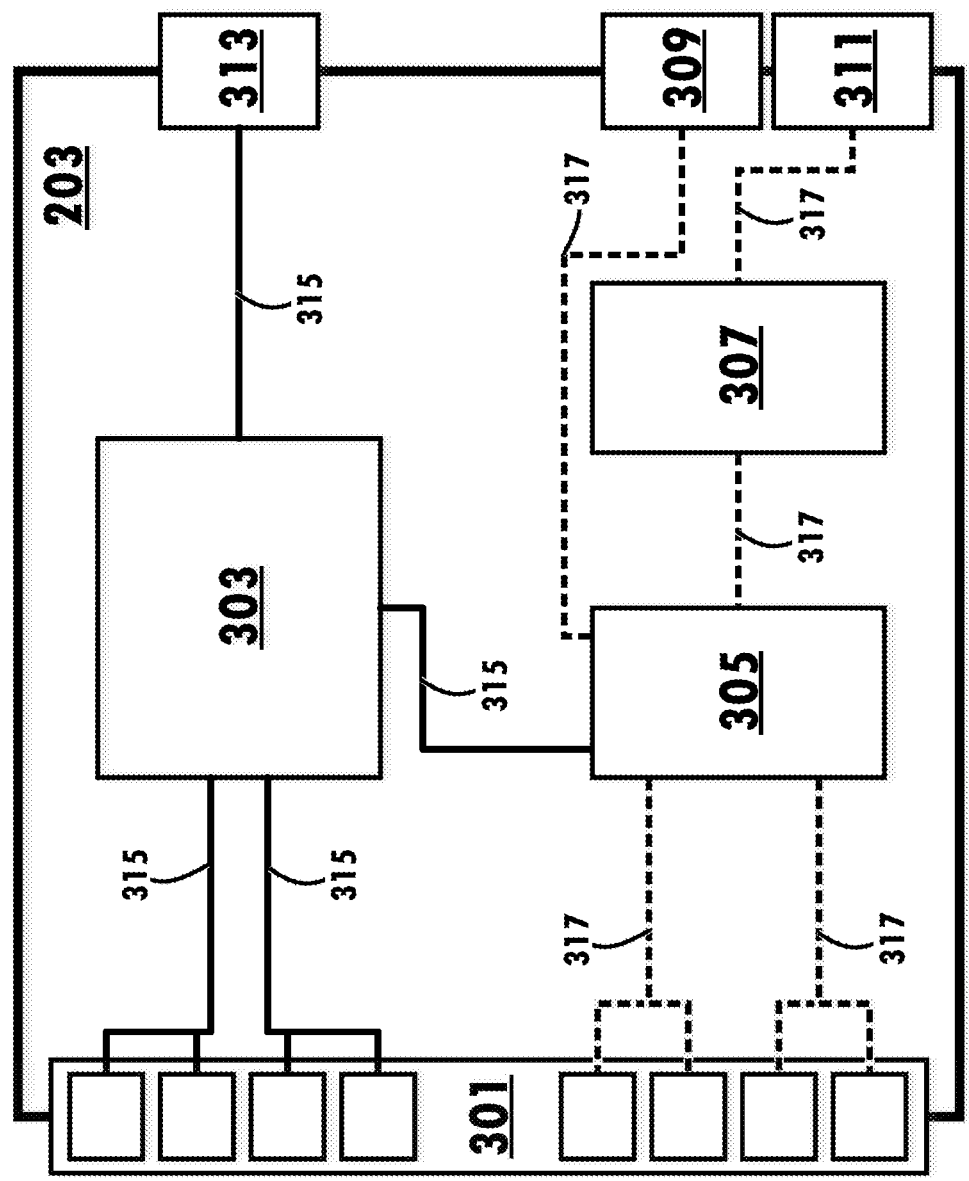
FIG. 3 is diagrammatic illustration of an electronic control unit and related components of an automated actuator system.

FIG. 3 is a diagrammatic illustration of sub-components of an ECU 203 (see FIG. 2). The ECU 203 comprises a twisted-wire connector 301, a controller 303, a charge manager 305, an energy storage manager 307, an energy storage port 309, an actuator power port 311 and a data port 313. The elements of ECU 203 are in electrical communication with one or more other elements via a network of data channels 315 and power channels 317.

Twisted-wire connector 301 provides a multi-pin input operable to receive signal from a twisted-wire connection, such as twisted-wire connection 211 (see FIG. 2). Some of the pins of twisted-wire connector 301 may provide data signal, and some may provide power signal. Controller 303 may be operable to control the functions of the other elements of ECU 203, and receives a data signal from twisted-wire connector 301 via a number of data channels 315. In the depicted embodiment, two separate data channels 315 connect controller 303 to twisted-wire connector 301, but other embodiments may comprise other configurations without deviating from the teachings disclosed herein. In the depicted embodiment, controller 303 is also in data communication with charge manager 305 via a data channel 315. Charge manager 305 is operable to receive a power signal from twisted-wire connector 301 via a number of power channels 317. In the depicted embodiment, two power channels 317 connect charge manager 305 to twisted-wire connector 301, but other embodiments may comprise other configurations without deviating from the teachings disclosed herein.

Charge manager 305 may be operable to regulate the charging of an associated energy storage unit, such as energy storage unit 205 (see FIG. 2). Charging may be accomplished by feeding a power signal at a first wattage level to energy storage manager 307, which is configured to safely charge the associated energy storage unit utilizing energy storage port 309. In the depicted embodiment, charge manager 305 acts as a pass-through for power flowing to energy storage port 309, which advantageously may permit charge manager 305 to measure the amount of energy already stored in an associated energy storage unit, the rate of power transfer to energy storage port 309, or the wattage of such a power transfer. These metrics may advantageously be used to selectively engage elements of ECU 203 for optimal operation of the associated system (see FIG. 2), or to protect one or more elements of the system from improper power delivery. Some embodiments may not utilize charge manager 305 as a pass-through between energy storage manager 307 and energy storage port 309 without deviating from the teachings disclosed herein.

Charge manager 305 may further be configured to provide power to an actuator via actuator power port 311. In the depicted embodiment, charge manager 305 utilizes energy storage manager 307 as a pass-through to actuator power port 311 for the purpose of providing sufficient wattage to operate an associated actuator (not shown). In the depicted embodiment, the power delivered to actuator power port 311 may comprise a second wattage level different than the first wattage level. In the depicted embodiment, the second wattage level may be higher than the first wattage level, but other embodiments may comprise other configurations without deviating from the teachings disclosed herein.

Charge manager 305 may further be in data communication with controller 303 via a data channel 315. This data communication may advantageously permit controller 303 to provide commands to charge manager 305 to optimize charging or discharging of an associated energy storage unit (not shown). Controller 303 may be operable to selectively engage or disengage power channels 317 to control the operation of an associated actuator. Controller 303 may comprise a memory having stored thereon a time schedule for charge; discharge operations. Controller 303 may be operable to measure the current energy level stored in an associated energy storage unit, and the rate of charging or discharging of the energy storage unit. In such embodiments, monitoring the energy level stored in the associated energy storage unit permits controller 303 to selectively engage or disengage power channels 317 in such a manner to prevent damage to the associated energy storage unit or another component within ECU 203. In such embodiments, monitoring the charging rate or discharging rate of the energy storage unit permits controller 303 to selectively engage or disengage power channels 317 in such a manner to prevent damage to the associated energy storage unit or another component within ECU 203. Other embodiments may not comprise monitoring the energy level or rate of change in energy level of an associated energy storage unit without deviating from the teachings disclosed herein.

In the depicted embodiment, controller 303 may further be operable to selectively engage or disengage power channels 317 in order to prevent improper function of the associated system. By way of example, and not limitation, controller 303 may be operable to detect when the stored energy level of an associated energy storage unit is insufficient to properly operate the function of a respective associated actuator. Upon detection, controller 303 may be operable to selectively close a circuit of power channels 317 such that power flows from the power connection pins of twisted wire connector 301 to energy storage port 309, while disengaging power channels 317 such that a circuit between energy storage port 309 and actuator power port 311 remains open. Thus, the associated energy storage unit would continue to accumulate additional energy until such time that proper operation of the associated actuator is feasible. In some embodiments, controller 303 may be operable to generate and transmit an associated error signal via the data connection pins of twisted wire connector 301 or via data port 313, informing other elements of the system of the operational error.

Similarly, controller 303 may be operable to detect when an operation is desired too soon after an earlier discharge of the associated energy storage unit, and thus insufficient energy is available to power the associated actuator. In such embodiments, controller 303 may be operable to configure power channels 317 to charge the energy storage unit, disconnect the actuator power port, and generate an error message indicating that the actuator may not be operated yet. These examples are not limiting, and those of ordinary skill will recognize other utilities for controller 303 monitoring energy conditions within the energy storage unit.

Figure 4:
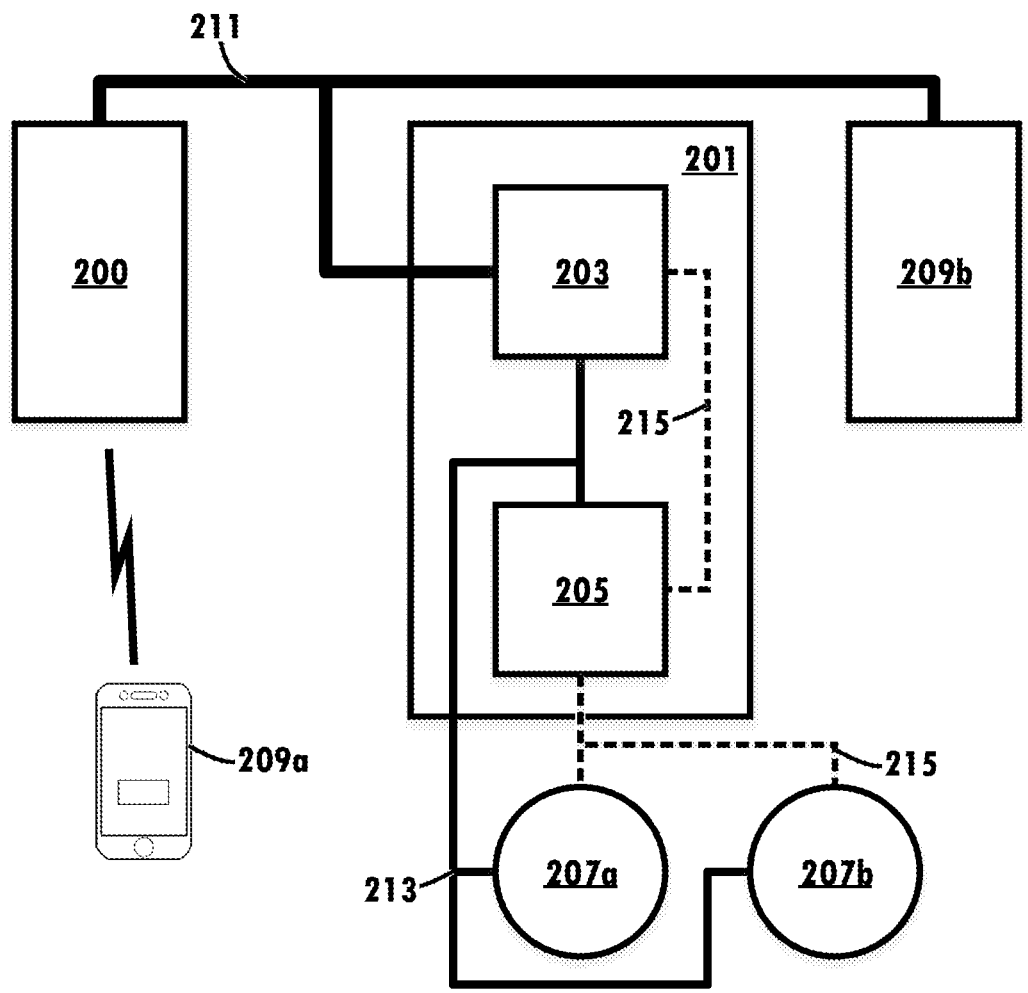
FIG. 4 is a diagrammatic illustration of a second embodiment of an automated actuator system.

ECU 203 may be configured to manage the operations of more than a single energy storage unit or actuator. FIG. 4 is a diagrammatic illustration of an alternative embodiment of an automated actuator system, wherein an ECU 203 is configured to control a plurality of actuators 207, each of the actuators powered from a single energy storage unit 205. In some embodiments, actuators 207 may comprise an array of similar actuators, such as coordinated motors to open a window. In the depicted embodiment, actuators 207a and 207b may comprise different functions. By way of example, and not limitation, actuator 207a may comprise a window locking mechanism, and actuator 207b may comprise a vent shutter adjustment mechanism. In the depicted embodiment, actuator 207a and actuator 207b may comprise different power consumption requirements, but other embodiments may comprise other configurations without deviating from the teachings disclosed herein.

In the depicted embodiment, the engagement of actuators 207 may conform to a time schedule coordinating their operation such that operation is not interrupted by a lack of energy stored in energy storage unit 205. Additional user input from one of HMIs 209 may be utilized to perform an impromptu operation of one or more of actuators 207. In some embodiments, user input from one or more of the HMIs 209 may be utilized to define a time schedule defining the coordinated operation of actuators 207.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. An automated actuator system, comprising:
   a controller;
   a twisted-wire connector in electrical communication with the controller and operable to transmit electrical power at a first wattage level;
   an energy storage unit configured to be in selective electrical communication with the twisted-wire connector, the energy storage unit operable to receive electrical power at the first wattage level and discharge electrical power at a second wattage level higher than the first wattage level;
   an actuator configured to be in selective electrical communication with the energy storage unit and in data communication with the controller, the actuator operable when receiving an electrical power above the first wattage level but not greater than the second wattage level; and
   a human-machine interface in data communication with the controller and operable to receive a user input, and
   wherein the controller is operable to selectively engage the electrical communication between the energy storage unit and the twisted-wire connector and also operable to selectively engage the electrical communication with the energy storage unit and the actuator the selective engagements being responsive to a user input received by the human-machine interface.

2. The automated actuator system of claim 1, wherein the twisted-wire connector comprises an Ethernet connector.

3. The automated actuator system of claim 1, wherein the controller is further operable to selectively engage the electrical communication between the energy storage unit and the actuator in accordance with a time schedule.

4. The automated actuator system of claim 3, wherein the time schedule is defined by a user input of the human-machine interface.

5. The automated actuator system of claim 4, wherein the twisted-wire connector is utilized to deliver the user input to the controller.

6. The automated actuator system of claim 1, wherein the actuator is operable to adjust a window latch.

7. The automated actuator system of claim 1, wherein the actuator is operable to adjust a door lock.

8. The automated actuator system of claim 1, wherein the actuator is operable to adjust an air vent.

9. The automated actuator system of claim 1, wherein the energy storage unit comprises a super-capacitor.

10. An automated actuator system, comprising:
    a controller;
    a twisted-wire connector in electrical communication with the controller and operable to transmit electrical power at a first wattage level;
    an energy storage unit configured to be in selective electrical communication with the twisted-wire connector, the energy storage unit operable to receive electrical power at the first wattage level and discharge electrical power at a second wattage level higher than the first wattage level;
    a first actuator configured to be in selective electrical communication with the energy storage unit and in data communication with the controller, the first actuator operable when receiving a first operational wattage above the first wattage level but not greater than the second wattage level;
    a second actuator configured to be in selective electrical communication with the energy storage unit and in data communication with the controller, the second actuator operable when receiving a second operational wattage above the first wattage level but not greater than the second wattage level; and a human-machine interface in data communication with the controller and operable to receive a user input, and wherein the controller is operable to selectively engage the electrical communication between the energy storage unit and the twisted-wire connector, operable to selectively engage the electrical communication with the energy storage unit and the first actuator, and operable to selectively engage the electrical communication with the energy storage unit and the second actuator, the selective engagements being responsive to a user input received by the human-machine interface.

11. The automated actuator system of claim 10, wherein the twisted-wire connector comprises an Ethernet connector.

12. The automated actuator system of claim 10, wherein the controller is further operable to selectively engage the electrical communication between the energy storage unit and the first actuator in accordance with a time schedule and operable to selectively engage the electrical communication between the energy storage unit and the second actuator in accordance with the time schedule.

13. The automated actuator system of claim 12, wherein the controller is operable to detect the available wattage deliverable by the energy storage unit.

14. The automated actuator system of claim 13, wherein the time schedule is defined in accordance with the deliverable wattage of the energy storage unit based upon the first wattage level, the second wattage level, and an expected rate of increase in deliverable wattage during a recharging cycle of the energy storage unit after a discharge.

15. The automated actuator system of claim 12, wherein the time schedule is defined by a user input of the human-machine interface.

16. The automated actuator system of claim 15, wherein the twisted-wire connector is utilized to deliver the user input to the controller.

17. The automated actuator system of claim 10, wherein the first actuator is operable to adjust a window latch.

18. The automated actuator system of claim 17, wherein the second actuator is operable to adjust a door lock.

19. The automated actuator system of claim 10, wherein the first actuator is operable to adjust an air vent.

20. The automated actuator system of claim 10, wherein the energy storage unit comprises a super-capacitor.

* * * * *

UNITED STATES PATENT AND TRADEMARK OFFICE
CERTIFICATE OF CORRECTION

| | |
|---|---|
| PATENT NO. | : 10,587,309 B1 |
| APPLICATION NO. | : 16/410394 |
| DATED | : March 10, 2020 |
| INVENTOR(S) | : Timothy Scott, Todd Ellis and Rainer Berger |

Page 1 of 1

It is certified that error appears in the above-identified patent and that said Letters Patent is hereby corrected as shown below:

In the Claims

In Claim 1, at Column 8, Line 25, insert --,-- between the words "actuator" and "the".

Signed and Sealed this
Eighteenth Day of August, 2020

Andrei Iancu
*Director of the United States Patent and Trademark Office*